United States Patent
Shimodaira

(10) Patent No.: US 10,836,039 B2
(45) Date of Patent: Nov. 17, 2020

(54) CONTROL DEVICE AND ROBOT SYSTEM

(71) Applicant: Seiko Epson Corporation, Tokyo (JP)

(72) Inventor: Yasuhiro Shimodaira, Matsumoto (JP)

(73) Assignee: Seiko Epson Corporation (JP)

( * ) Notice: Subject to any disclaimer, the term of this patent is extended or adjusted under 35 U.S.C. 154(b) by 339 days.

(21) Appl. No.: 15/895,438

(22) Filed: Feb. 13, 2018

(65) Prior Publication Data

US 2018/0236660 A1    Aug. 23, 2018

(30) Foreign Application Priority Data

Feb. 17, 2017    (JP) .................................. 2017-027886

(51) Int. Cl.
    *B25J 9/16*     (2006.01)
    *G01L 5/00*     (2006.01)
    *G01L 5/22*     (2006.01)

(52) U.S. Cl.
    CPC .......... *B25J 9/1633* (2013.01); *B25J 9/1669* (2013.01); *B25J 9/1679* (2013.01); *B25J 9/1694* (2013.01); *G01L 5/009* (2013.01); *G01L 5/226* (2013.01); *G05B 2219/39259* (2013.01); *G05B 2219/45089* (2013.01); *Y10S 901/09* (2013.01); *Y10S 901/41* (2013.01); *Y10S 901/46* (2013.01)

(58) Field of Classification Search
    CPC ...... B25J 9/1633; B25J 9/1669; B25J 9/1679; B25J 9/1694; G01L 5/009; G01L 5/226; G05B 2219/39259; G05B 2219/45089; Y10S 901/09; Y10S 901/41; Y10S 901/46
    See application file for complete search history.

(56) References Cited

U.S. PATENT DOCUMENTS

| | | | | |
|---|---|---|---|---|
| 4,461,936 A | * | 7/1984 | Kimura | B23K 9/287 200/61.41 |
| 5,946,449 A | * | 8/1999 | Dickerson | B25J 9/1697 700/250 |
| 6,147,674 A | * | 11/2000 | Rosenberg | B25J 9/1689 345/157 |
| 7,091,948 B2 | * | 8/2006 | Chang | G06F 3/016 345/156 |

(Continued)

FOREIGN PATENT DOCUMENTS

| | | |
|---|---|---|
| JP | H06-082345 A | 3/1994 |
| JP | H07-098266 A | 4/1995 |

(Continued)

OTHER PUBLICATIONS

Extended European Search Report for Application No. EP 18 15 6921 dated Jul. 16, 2018 (8 pages).

*Primary Examiner* — Harry Y Oh
*Assistant Examiner* — George Sun
(74) *Attorney, Agent, or Firm* — Harness, Dickey & Pierce, P.L.C.

(57) ABSTRACT

A control device includes: a processor that is configured to execute computer-executable instructions so as to control a robot provided with a force sensor, wherein the processor is configured to display a first detection result in which specific position information indicating a specific position of the robot and force information output from a force sensor correspond to each other on a display, in a case where robot inspects an operation component that outputs an electric signal corresponding to an operation.

18 Claims, 14 Drawing Sheets

(56) References Cited

U.S. PATENT DOCUMENTS

| | | | |
|---|---|---|---|
| 8,600,552 B2* | 12/2013 | Nakajima | B25J 9/1697 |
| | | | 700/245 |
| 8,706,429 B2* | 4/2014 | Nakajima | B25J 13/085 |
| | | | 700/261 |
| 8,761,938 B2* | 6/2014 | Jenkinson | B25J 13/085 |
| | | | 700/259 |
| 9,046,887 B2* | 6/2015 | Orita | B25J 9/1633 |
| 9,300,430 B2* | 3/2016 | Summer | H04L 43/0852 |
| 9,303,988 B2* | 4/2016 | Tani | G01C 11/02 |
| 10,081,103 B2* | 9/2018 | Boss | B25J 9/1671 |
| 2011/0089952 A1* | 4/2011 | Baima | H01H 11/0062 |
| | | | 324/415 |
| 2011/0270443 A1* | 11/2011 | Kamiya | G05B 19/401 |
| | | | 700/245 |
| 2016/0354925 A1 | 12/2016 | Shimodaira et al. | |
| 2017/0028569 A1* | 2/2017 | Matthews | B25J 11/00 |
| 2018/0021949 A1* | 1/2018 | Miura | B25J 9/1633 |
| | | | 700/250 |
| 2018/0207798 A1* | 7/2018 | Tsuzaki | B25J 13/088 |

FOREIGN PATENT DOCUMENTS

| | | |
|---|---|---|
| JP | 2010-203821 A | 9/2010 |
| JP | 2016-221653 A | 12/2016 |
| JP | 2017-030068 A | 2/2017 |

* cited by examiner

CONTROL DEVICE AND ROBOT SYSTEM

BACKGROUND

1. Technical Field

The present invention relates to inspection of operation components by using a robot.

2. Related Art

JP-A-2010-203821 describes an inspection apparatus that determines the quality of a button of an electronic device such as a mobile phone by using a robot. In this related art, there is a description relating to an algorithm for calculating a relationship between a change in a load at the time of button inspection and an operation amount (stroke amount) of the button.

In the related art, there is no description relating to a technique for securing an accurate correspondence relationship between the change in the load of the button and a change in the operation amount of the button. However, the inventors of the present application find out that since there is deviation between the change in the load of the button input to the inspection apparatus and the change in the operation amount of the button, there is a problem that it is difficult to accurately determine quality of the button in a state where both changes does not accurately correspond to each other. In the related art, there was no recognition of such a problem. Such a problem is not limited to the inspection of buttons of electronic devices such as mobile phones but is generally a problem common to the inspection of operation components that output electric signals according to a manual operation.

SUMMARY

An advantage of some aspects of the invention is to solve at least a part of the problems described above, and the invention can be implemented as the following aspects.

(1) According to a first aspect of the invention, a control device that can control a robot is provided. The control device includes a processor that is configured to execute computer-executable instructions so as to control a robot provided with a force sensor, wherein the processor is configured to display a first detection result in which specific position information indicating a specific position of the robot and force information output from the force sensor correspond to each other on a display, in a case where robot inspects an operation component that outputs an electric signal corresponding to an operation.

According to the control device, since the first detection result in which specific position information indicating the specific position of the robot and force information output from the force detection portion of the robot accurately correspond to each other is displayed on the display, the quality of the operation components can be accurately determined.

(2) In the control device, the first detection result may be a detection result that resolves temporal reception deviation between the specific position information that is output from an encoder provided in the robot to the control device and the force information that is output from the force sensor to the control device.

According to the control device, since the first detection result in which the temporal reception deviation between the specific position information and the force information is resolved and accurately corresponds to each other is displayed on the display, the quality of the operation component can be more accurately determined.

(3) In the control device, the first detection result may include a display of a first allowable range relating to a correspondence relationship between the specific position information and the force information.

According to the control device, since the first detection result includes the display of the first allowable range relating to the correspondence relationship between the specific position information and the force information, the quality of the operation component can be more accurately determined.

(4) In the control device, the processor may be configured to display a second detection result in which the specific position information or the force information, and an electric signal that is output from the operation component operated by the robot correspond to each other on a display.

According to the control device, since the second detection result in which the specific position information or the force information of the robot, and the electric signal that is output from the operation component accurately correspond to each other is displayed on the display, the quality of the operation component can be more accurately determined.

(5) In the control device, the second detection result may be a detection result which resolves temporal reception deviation between the specific position information or the force information that is output from the encoder or the force sensor to the control device and the electric signal that is output from the operation component to the control device.

According to the control device, since the second detection result in which the temporal reception deviation between the specific position information or the force information and the electric signal of the operation component is resolved and accurately correspond to each other is displayed on the display, the quality of the operation component can be more accurately determined.

(6) In the control device, the second detection result may include a display of a second allowable range relating to a correspondence relationship between the specific position information or the force information and the electric signal.

According to the control device, since the second detection result includes the display of the second allowable range relating to the correspondence relationship between the specific position information or the force information and the electric signal, the quality of the operation component can be more accurately determined.

(7) In the control device, the force detection portion may be able to detect a plurality of force components in an axis direction, the force information may include a plurality of pieces of force component information indicating the plurality of force components in the axis direction, and the first detection result may include a plurality of correspondence relationships corresponding the specific position information and each of the plurality of pieces of force component information to each other.

According to the control device, since the first detection result in which the specific position information and each of the plurality of pieces of force component information accurately correspond to each other is displayed on the display portion, the quality of the operation component can be more accurately determined.

(8) According to a second aspect of the invention, a robot system including a robot with a force sensor and the control device described above connected to the robot is provided.

According to the robot system, since the first detection result in which the specific position information indicating the specific position of the robot and the force information output from the force sensor accurately correspond to each other is displayed on the display, the quality of the operation component can be accurately determined.

(9) In the robot system, the operation component may be a rotary knob.

According to the robot system, the quality of the rotary knob can be more accurately determined.

(10) In the robot system, the operation component may be a slide switch.

According to the robot system, the quality of the slide switch can be more accurately determined.

(11) In the robot system, the operation component may be a lever.

According to the robot system, the quality of the lever can be more accurately determined.

(12) In the robot system, a plurality of the operation components may be able to be inspected by the robot, and the processor may be configured to continuously operate the plurality of operation components for inspection of the plurality of operation components before resetting the force sensor again after resetting the force sensor.

According to the robot system, since a plurality of operation components are continuously operated immediately after resetting the force sensor, the influence of the drift of the force sensor can be suppressed to a minimum and the quality of the plurality of operation components can be accurately determined.

(13) In the robot system, the processor may be configured to reduce reduce an operation speed of the specific position more than before the output from the force detection portion exceeds the first threshold value after the output from the force sensor exceeds the first threshold value.

According to the robot system, since the inspection is performed slowly in a case where the output from the force sensor exceeds the first threshold value, the quality of the operation component can be more accurately determined. In addition, it is possible to prevent the overshoot of the operation amount with respect to the operation component from being excessively large.

(14) In the robot system, the processor may be configured to reduce an operation speed of the specific position more than before the output from the position detection portion exceeds the second threshold value after the output from the encoder exceeds the second threshold value.

According to the robot system, since the inspection is performed slowly in a case where the output from the encoder exceeds the second threshold value, the quality of the operation component can be more accurately determined. In addition, it is possible to prevent the overshoot of the operation amount with respect to the operation component from being excessively large.

The invention can be realized in various forms other than the above. For example, it can be realized in the form of a computer program for realizing the functions of the robot and the control device described above, a non-transitory storage medium in which the computer program is recorded, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
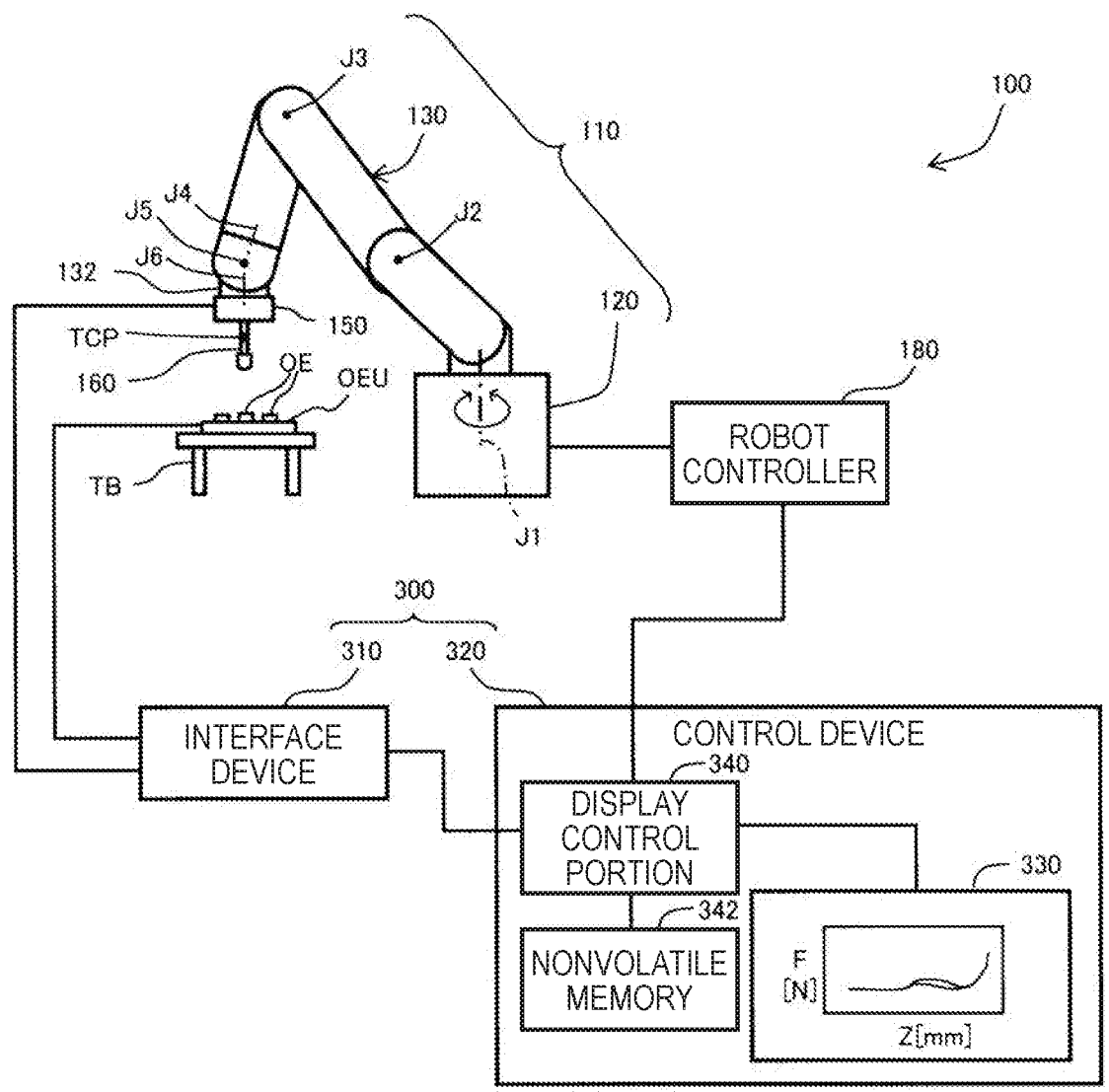
FIG. 1 is a conceptual diagram of a robot system.

A. Configuration of Robot System:

FIG. 1 is a conceptual diagram of a robot system according to an embodiment. The robot system includes a robot 100 and a control system 300 that can inspect an operation component OE. The robot 100 has a robot main body 110 and a robot controller 180. The robot 100 is a teaching playback type robot, and an operation program created by teaching is stored in the robot controller 180. The control system 300 includes an interface device 310 and a control device 320. The interface device 310 may be provided inside the control device 320. In addition, the control device 320 may be realized as a portion of the robot controller 180.

The robot main body 110 includes a base 120 and an arm 130. The arm 130 is sequentially connected by six joints J1 to J6. Among these joints J1 to J6, the three joints J2, J3 and J5 are bending joints and the other three joints J1, J4 and J6 are torsional joints.

A force detection portion 150 and an end effector 160 are mounted in this order on an arm end 132 which is a tip portion of the arm 130. In the example of FIG. 1, the end effector 160 is a straight rod-like pressing member used for pressing inspection of the operation component OE. Other types of end effector 160 used for inspecting the operation component OE will be described below. In this specification, the end effector 160 is also referred to as "tool or robotic tool".

The force detection portion 150 is a sensor that detects a force applied to the end effector 160. As the force detection portion 150, it is possible to use a load cell that can detect a force in a single axis direction or a force sensor or a torque sensor that can detect a plurality of axial force components. In the present embodiment, a six-axis force sensor is used as the force detection portion 150. The six-axis force sensor detects the magnitude of the force parallel to three detection axes orthogonal to each other in the unique sensor coordinate system and the magnitude of the torque around the three detection axes. If a six-axis force sensor is used, it is preferable to be able to inspect whether or not unnecessary forces are applied to each axis in the inspection of the operation component OE. The force detection portion 150 may be provided at a position other than the position of the end effector 160 and may be provided, for example, at one or more joints among the joints J1 to J6.

A predetermined position on the rotational axis of the joint J6 of the arm end 132 is referred to as "tool center point TCP". A position of the tool center point TCP can be used as a tool position of the robot 100. In this embodiment, although a six-axis robot is illustrated, a robot having an arbitrary arm mechanism having one or more joints can be used.

The control device 320 is a device for inspecting an operation component OE that outputs an electric signal according to an operation. In a case where the robot 100 inspects the operation component OE, the robot 100 can be controlled. In the example of FIG. 1, the operation component OE is mounted on the operation component unit OEU. The operation component unit OEU is mounted and fixed on the table TB. The control device 320 has a display portion (a display) 330 that displays the inspection result, a display control portion 340 for displaying the inspection result on the display portion 330, and a nonvolatile memory 342. The nonvolatile memory 342 may be located outside the control device 320. The control device 320 receives the output of the force detection portion 150 and the output of the operation component unit OEU via the interface device 310, respectively. In addition, the control device 320 receives the position information of the tool center point TCP from the robot controller 180. The nonvolatile memory 342 stores logs of various kinds of information and signals received by the control device 320 at the time of inspection and data such as a reception deviation amount therebetween. The control device 320 can be realized, for example, by mounting an application program for inspection of operation components on a personal computer. The display portion 330 may be separate from the control device 320.

Figure 2:
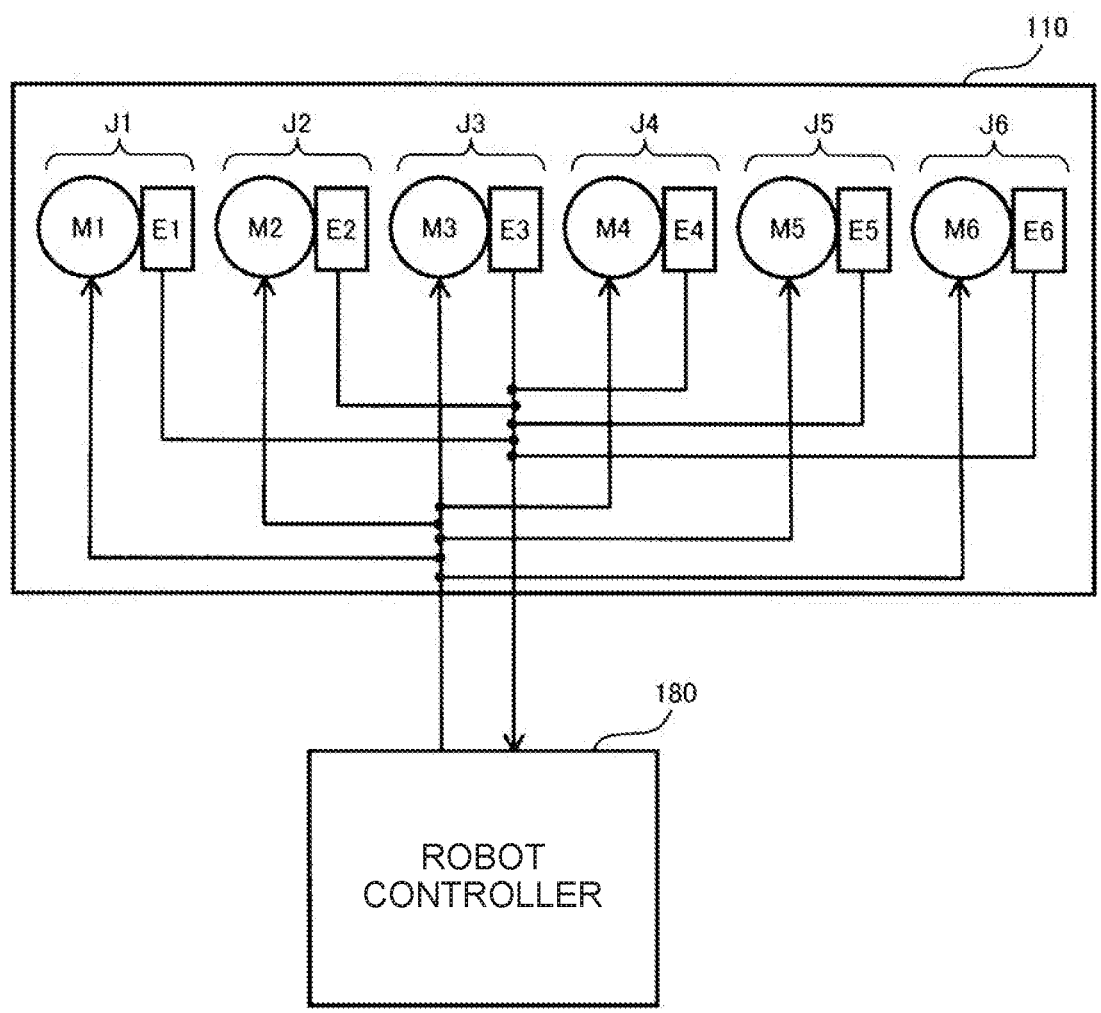
FIG. 2 is an explanatory view illustrating a connection state between a robot main body and a robot controller.

FIG. 2 illustrates an electrical connection state between the robot main body 110 and the robot controller 180. The robot main body 110 includes motors M1 to M6 as actuators and encoders E1 to E6 as position sensors. The motors M1 to M6 and the encoders E1 to E6 are provided for each of the joints J1 to J6. Encoders E1 to E6 are position detection portions for detecting the rotation angles of the motors M1 to M6. The rotation angle of the motors M1 to M6 is transmitted from the robot main body 110 to the robot controller 180 as position information indicating the positions of the joints J1 to J6. The robot controller 180 transmits these position information to the control device 320 as position information indirectly indicating the position of the end effector 160 (the position of the tool center point TCP). The position information directly indicating the position of the end effector 160 may be transmitted from the robot controller 180 to the control device 320. In the present specification, position information directly or indirectly indicating the position of the end effector 160 is referred to as "tool position information".

As can be understood from FIG. 1, the control device 320 receives the position information from the robot 100, the force information from the force detection portion 150, and the electric signal from the operation component OE via signal paths which are different from each other. Therefore, when receiving by the control device 320, there is temporal reception deviation between these pieces of information and the electric signal. The display control portion 340 has a function of resolving such temporal reception deviation, executing a process of accurately corresponding to the inspection results with each other and displaying the inspection result after the correspondence process on the display portion 330. This function will be described below. A process for realizing this function is not limited to the display control portion 340 and other circuits and constituent elements may be executed. The display control portion 340 can be realized by a processor such as a CPU and a main memory, for example.

Figure 3:
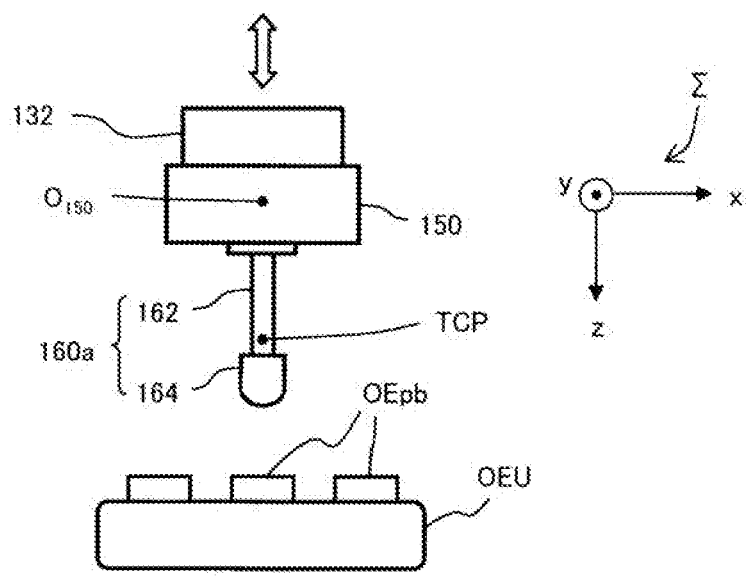
FIG. 3 is an explanatory view illustrating an example of an end effector.

FIG. 3 is an explanatory diagram illustrating an example of the end effector 160. Here, as the end effector 160a, a straight rod-shaped member 162 used for pressing inspection of the operation component OEpb is used. The operation component OEpb is a push button type switch that outputs an electric signal according to the pressing operation. The end effector 160a has a straight rod-shaped member 162 and a contact member 164 provided at the tip of the rod-shaped member 162, and is configured to press the operation component OEpb with the contact member 164. The tip of the contact member 164 is preferably formed in a hemispherical shape or a dome shape. The contact member 164 is preferably formed of an elastic member such as an elastomer so as not to damage the operation component OEpb.

In FIG. 3, the initial position of the end effector 160a when the inspection of the operation component OEpb is started is illustrated. At the time of inspection, after the end effector 160a is positioned at this initial position, the inspection of the operation component OEpb is started. A coordinate origin point $O_{150}$ of the force detection portion 150 at the initial position is used as a coordinate origin point of the position coordinate system Σ at the time of inspection. The inspection position coordinate system Σ is defined by three orthogonal coordinate axes x, y, and z. It is preferable that these coordinate axes x, y, and z are set so as to coincide with the three coordinate axes of the force detection portion 150 at this initial position. The z-axis direction coincides with the direction in which the end effector 160a moves straight toward the operation component OEpb. In FIG. 3, for convenience of illustration, the inspection position coordinate system Σ is drawn on the right side of the coordinate origin point $O_{150}$.

In the present embodiment, the position of the end effector 160a in the inspection position coordinate system Σ (that is, tool position of robot 100) is used as a specific position of the robot 100. In other words, tool position information indicating the position of the end effector 160 is used as "specific position information" of the robot 100. However, other positions of the robot 100 other than the tool position may be used as the "specific position".

Figure 4:
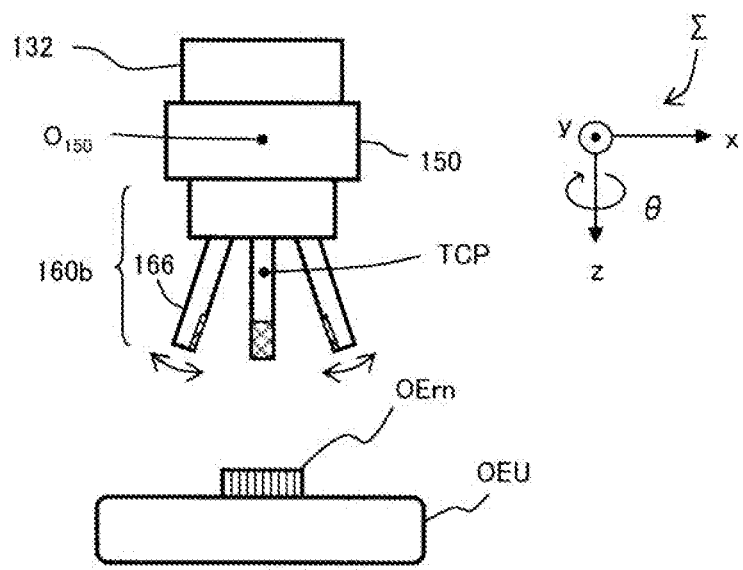
FIG. 4 is an explanatory view illustrating another example of the end effector.
Figure 5:
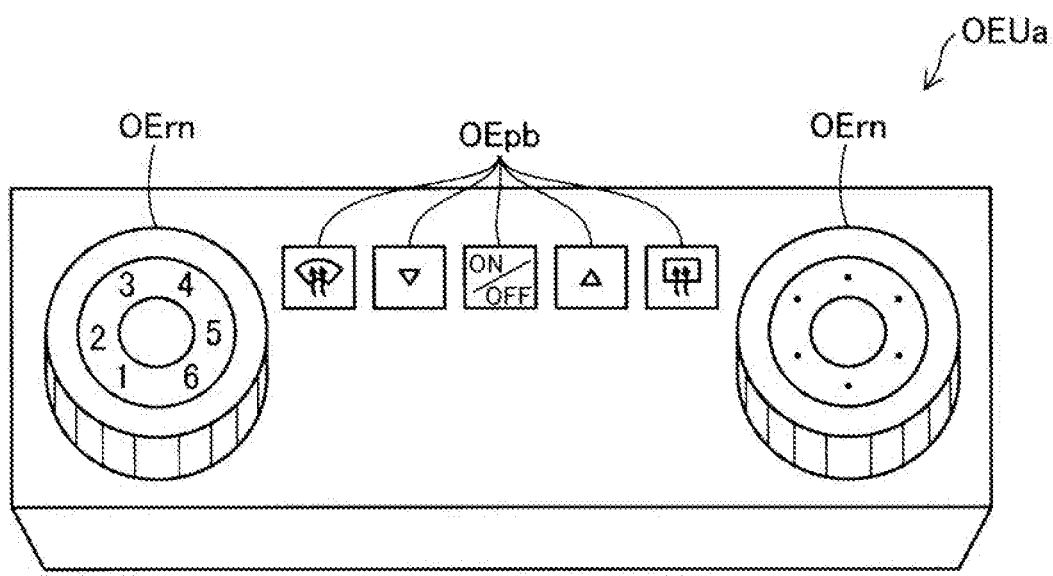
FIG. 5 is an explanatory view illustrating an example of an operation component unit.
Figure 6:
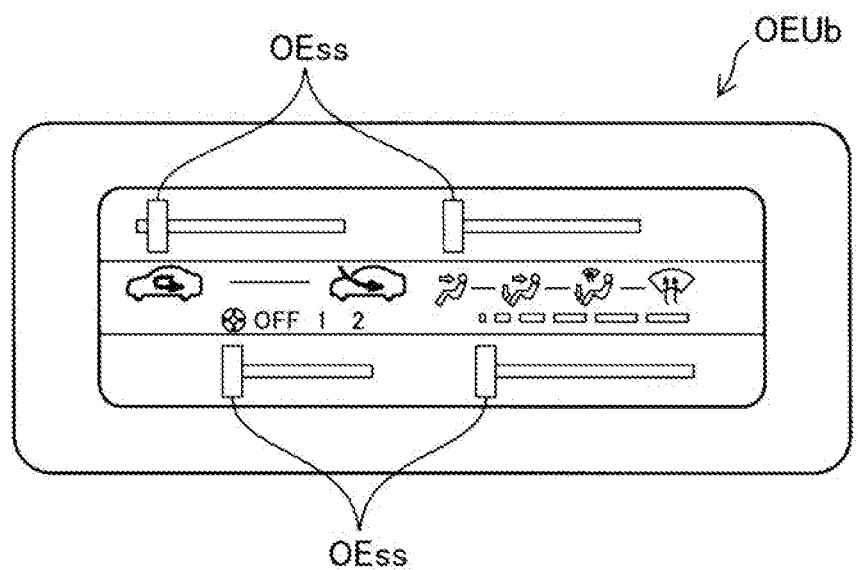
FIG. 6 is an explanatory view illustrating another example of an operation component unit.
Figure 7:
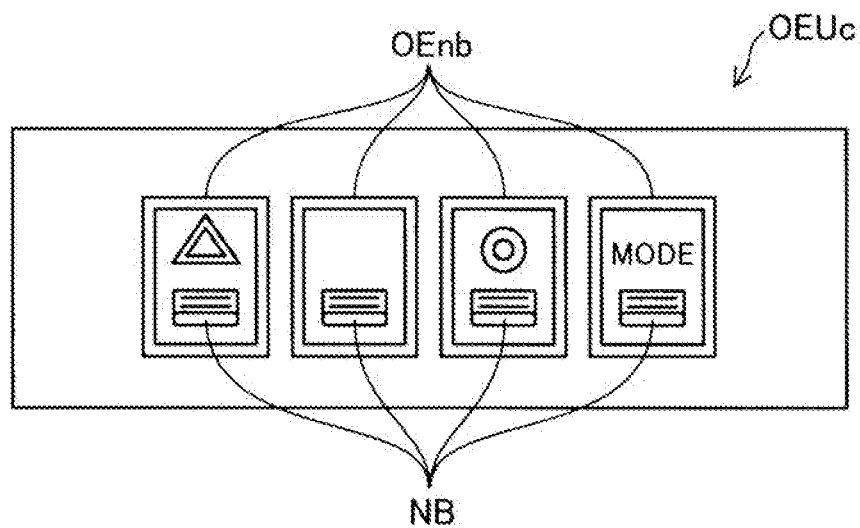
FIG. 7 is an explanatory view illustrating still another example of an operation component unit.
Figure 8:
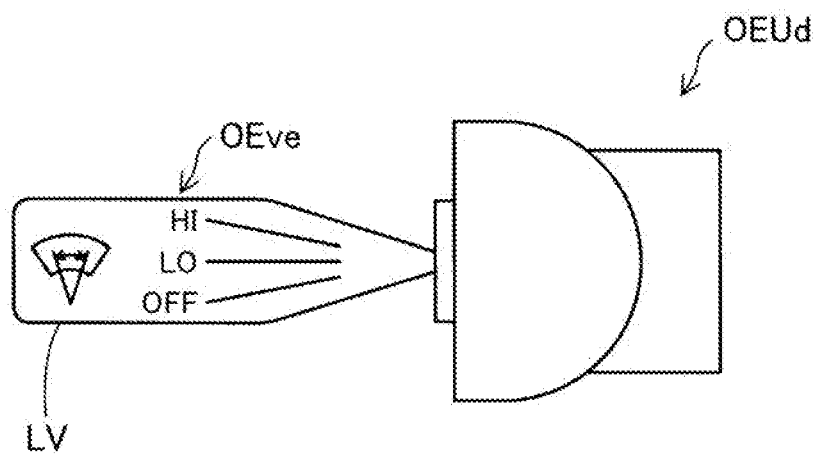
FIG. 8 is an explanatory view illustrating still another example of an operation component unit.

FIG. 4 is an explanatory view illustrating another example of the end effector 160. Here, as the end effector 160b, a mechanism having a gripping member 166 used for rotation inspection of the operation component OErn is used. The operation component OErn is a rotary knob type switch that outputs an electric signal according to the rotation operation. The end effector 160b has three gripping members 166, and is constituted so as to grip the outer periphery of the operation component OErn with these gripping members 166 and rotate the operation component. However, the number of the gripping members 166 may be two. It is preferable that the portion where the gripping member 166 contacts the operation component OErn is formed of an elastic member such as an elastomer so as not to damage the operation component OErn. FIG. 4 also illustrates an initial position of the end effector 160b when the inspection of the operation component OErn is started as in FIG. 3. In a case where the rotary knob type operation component OErn is inspected, the rotation angle θ about the z-axis is used as specific position information.

As can be understood from the examples of FIG. 3 and FIG. 4, one or more pieces of position information among position information on six axes of the inspection position coordinate system Σ (that is, position in three orthogonal axis directions and rotation angle around each axis) can be used, as the "specific position information" of the robot 100.

B. Examples of Operation Components:

FIG. 5 to FIG. 8 are explanatory diagrams illustrating examples of various operation component units OEU. The operation component unit OEUa in FIG. 5 has five push-button type operation components OEpb and two rotary knob type operation components OErn. The operation component unit OEUb in FIG. 6 has four slide switch type operation components OEss. The operation component unit OEUc of FIG. 7 has four the push knob type operation components OEnb. The push knob type operation component OEnb has a knob NB protruding to the outside and is a switch that outputs an electric signal according to an operation of pushing the knob NB downward or upward in FIG. 7. The operation component unit OEUd in FIG. 8 has a lever type operation component OEve. The operation component OEve is a switch that outputs an electric signal according to an operation of gripping the lever LV and moving the lever upward or downward in FIG. 8.

The operation component unit OEU and the operation component OE illustrated in FIG. 5 to FIG. 8 are merely examples, and it is possible to subject various kinds of operation component units OEU and operation components OE other than the operation component units OEU and operation components OE illustrated in FIG. 5 to FIG. 8 to inspection targets. For example, as a lever-type operation component OEve, it is possible to use operation component of other shapes and structures such as a shift lever of an automobile as an inspection target. In addition, the end effector 160 illustrated in FIG. 3 and FIG. 4 is also an example, and various end effectors can be used according to the structure of the operation component OE and the operation component unit OEU.

Figure 9:
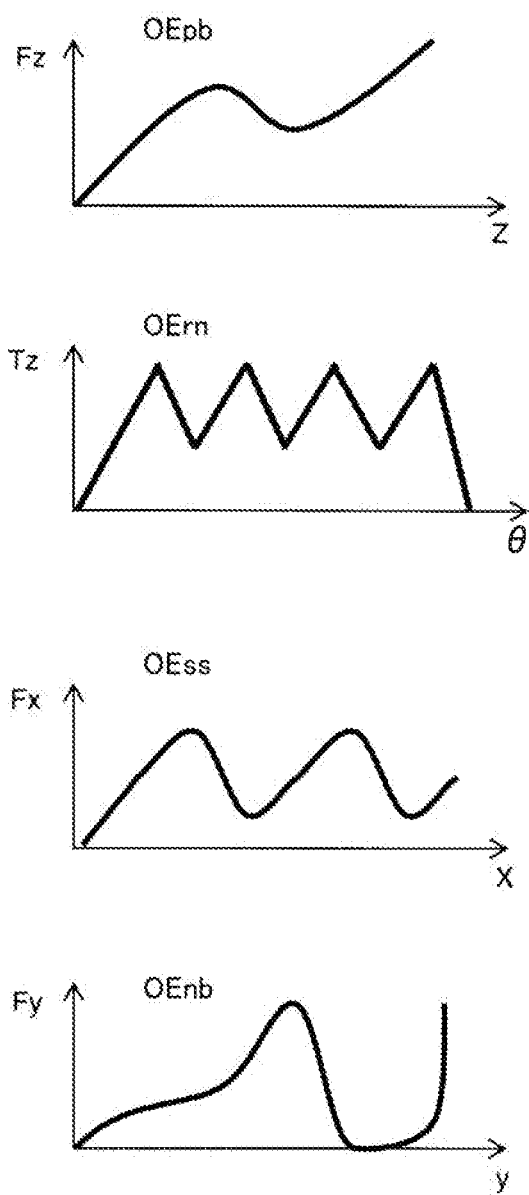
FIG. 9 is a diagram illustrating a typical relationship between an operation amount and forces relating to various operation components.

FIG. 9 illustrates typical relationships between operation amounts and forces relating to various operation components OE. In the push button type operation component OEpb, the force component Fz in the z-axis direction increases as the coordinate value z (FIG. 3) increases. The force component Fz decreases after reaching the upper peak value and then increases again after reaching the lower peak value. As for the rotary knob type operation component OErn, as the rotation angle θ about the z-axis increases, the torque component Tz around the z-axis repeats rise and fall and indicates a mountain-valley shape. The mountains and valleys of this characteristic correspond to the click feeling when the operation component OErn is rotated. The slide switch type operation component OEss indicates a mountain-valley shape in which the force component Fx in the x-axis direction repeats rise and fall as the coordinate value x increases. In a push knob type operation component OEnb, the force component Fy in the y-axis direction increases as the coordinate value y increases and the force component Fy decreases after reaching the upper peak value and increases again after reaching the lower peak value. The lower peak value of the force component Fy is almost zero. This corresponds to the sense that when the knob of the operation component OEnb is pushed, the reaction force from the knob abruptly disappears. The relationship between these operation amounts and force is a simple example, and there are various correspondence relationships depending on the type and structure of individual operation components OE.

As described above, temporal reception deviation exists between the force information which is output from the force detection portion 150 to the control device 320 and the specific position information which is output from the robot 100 to the control device 320. The display control portion 340 can execute a process of resolving such temporal reception deviation and accurately corresponding inspection results to each other. However, this processing is not limited to the display control portion 340, and other circuits and constituent elements may be executed.

Figure 10:
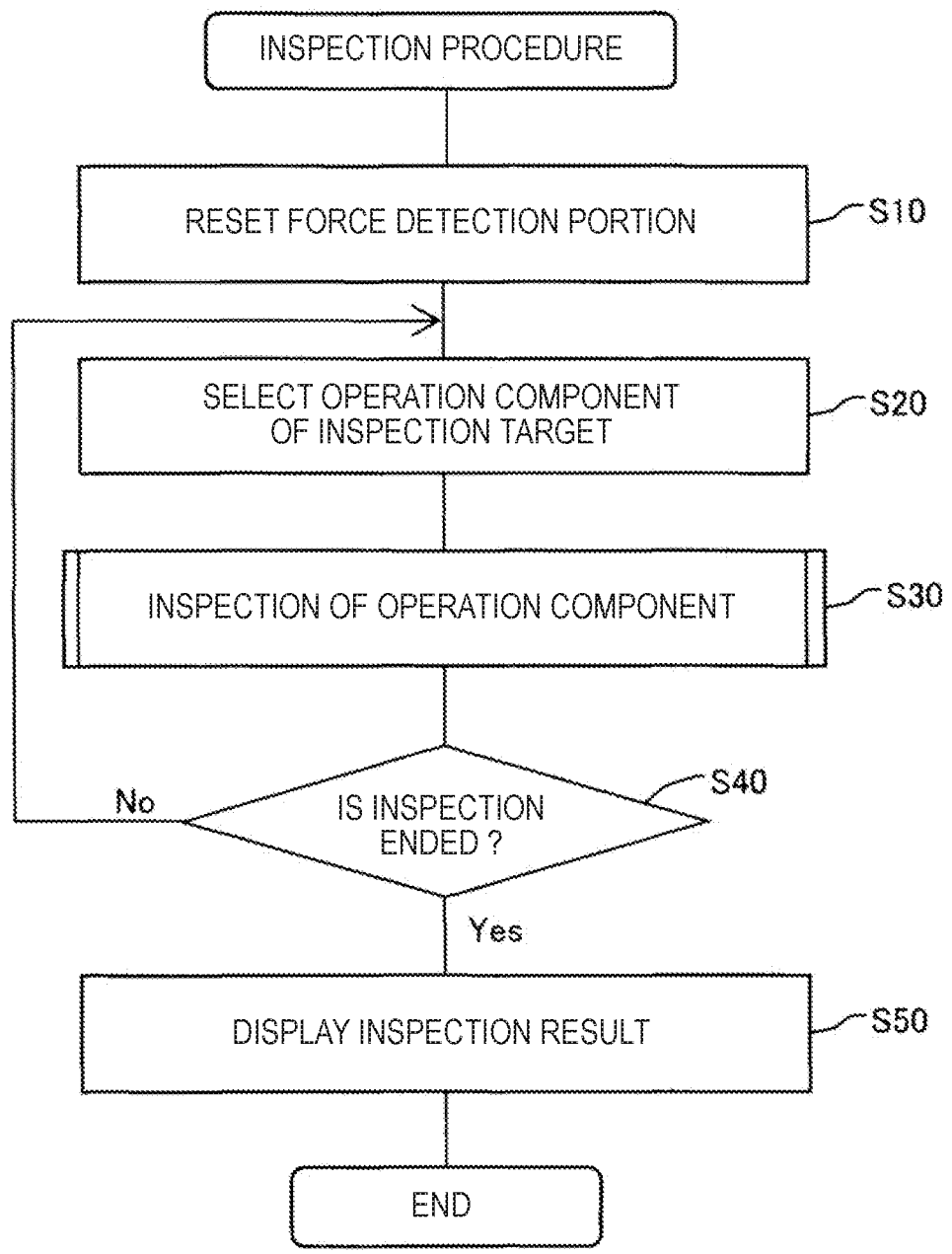
FIG. 10 is a flowchart illustrating an inspection procedure of an operation component.

C. Inspection Method of Operation Components:

FIG. 10 is a flowchart illustrating an inspection procedure of operation components. As illustrated in FIG. 1, this flow is started in a state where the operation component unit OEU is disposed near the end effector 160. In step S10, the control device 320 resets the force detection portion 150. This reset is a process for resolving undesirable output shift of the force detection portion 150. In addition, this reset means a process of setting the output value (force detection value) of the force detection portion 150 to a predetermined value (reference value). In other words, the resetting of the force detection portion 150 is a process of eliminating or reducing the influence of gravity due to variation of the weight of the workpiece, the posture of the arm 130, or the like, the effect of drift due to circuit leakage current, thermal expansion, or the like. In other words, under the condition that variation of the weight of the workpiece, the influence of gravity due to the posture of the arm 130, or the like, the influence of drift due to circuit leak current, thermal expansion, or the like, the value output from the force detection portion 150 is set to a predetermined value (reference value). The predetermined value is preferably "0". In step S20, the control device 320 selects one operation component OE to be inspected from among one or more operation components OE which are provided in the operation component unit OEU. In step S30, the control device 320 executes inspection of the operation component OE using the robot 100. Specifically, the control device 320 causes the robot 100 to operate the operation component OE using the end effector 160, and the specific position information, the force information, and the electric signals outputted from the operation component OE are collected. The operation of the operation component OE at the time of inspection is preset according to the type of the operation component OE. For example, the operation with respect to the push button type operation component OEpb (FIG. 3) is an operation to move the straight rod-shaped end effector 160a in the z-direction and push the operation component OEpb. In addition, the operation with respect to the rotary knob type operation component OErn (FIG. 4) is an operation of gripping the outer periphery of the operation component OErn and rotating the operation component by using the end effector 160b that can grip the operation component OErn. A specific example of step S30 will be described below. In step S40, the control device 320 determines whether or not the inspection of all the operation components OE to be inspected is ended among the operation components OE which are provided in the operation component unit OEU. If the inspection is not ended, the process returns to step S20, the next operation component OE is selected and step S30 is executed again. If the inspection is ended, the inspection result is displayed on the display portion 330 of the control device 320 in step S50.

According to the inspection procedure of FIG. 10, since the plurality of operation components OE are continuously operated and inspected before resetting the force detection portion 150 again after resetting the force detection portion 150, the influence of the drift of the force detection portion 150 can be suppressed to a minimum and the quality of a plurality of operation components OE can be accurately determined. In addition, the continuous inspection of the operation components OE is also preferable in that the inspection time can be shortened.

Figure 11:
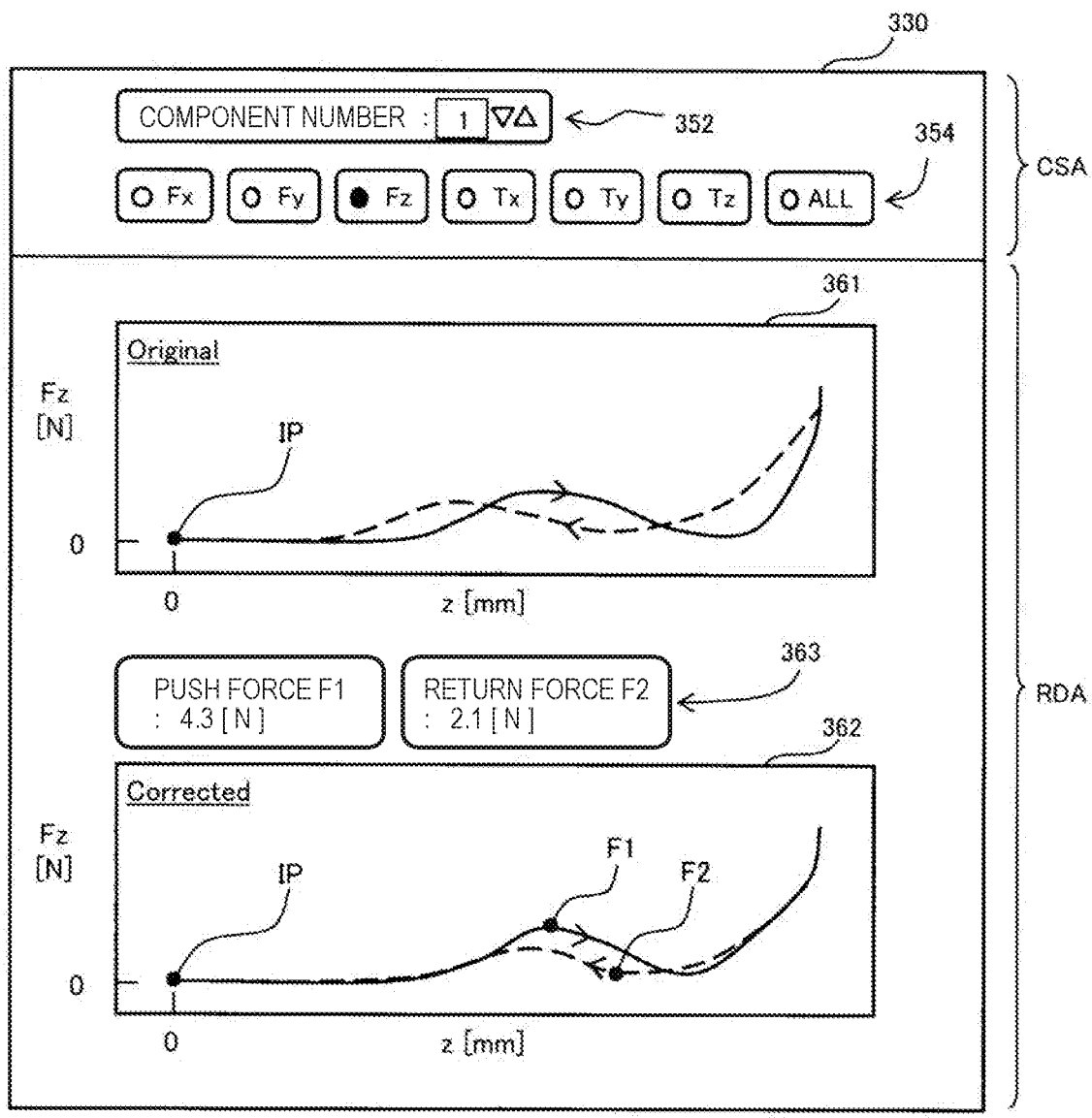
FIG. 11 is a diagram illustrating an example of an inspection result screen.

FIG. 11 illustrates an example of an inspection result screen displayed on the display portion 330. This screen has a condition setting area CSA and a result display area RDA. The condition setting area CSA includes a component number selection portion 352 and a force component selection portion 354. The component number selection portion 352 is an input element for selecting the number of the operation component OE for displaying the inspection result. The force component selection portion 354 is an input element for selecting which of the force components Fx, Fy, Fz, Tx, Ty, and Tz of the six axes to display. Tx, Ty, and Tz are the torques around the respective axes. In this example, it is selected to display the force component Fz in the z-axis direction in the inspection result for the push button type operation component OEpb (FIG. 3) as a target, for example. The condition setting area CSA can be arbitrarily designed to include various other input elements.

Various inspection results can be displayed in the result display area RDA. In the example of FIG. 11, an original detection result 361 and the first detection result 362 after the correspondence process which will be described below are displayed as the inspection result indicating the relationship between the specific position and the force of the robot 100. The original detection result 361 indicates the correspondence relationship between the specific position information received by the display control portion 340 (FIG. 1) and the force information. The horizontal axis of the original detection result 361 is a z-coordinate value of the tool position as the specific position information and the vertical axis is a force component Fz as the force information. These horizontal axis and vertical axis are changed according to input to the condition setting area CSA. In this example, the push button type operation component OEpb is an object to be inspected, an inspection result in a process of pushing the operation component OEpb in the +z-direction by the end effector 160 is drawn by a solid line and an inspection result in a process of retracting the end effector 160 in the −z-direction is drawn by broken lines. The initial position IP for inspection corresponds to the initial position of the end effector 160 exemplified in FIG. 3 and FIG. 4.

As described above, when the specific position information and the force information as the inspection result are received by the control device 320, temporal reception deviation exists between these pieces of information. The original detection result 361 is a result that is considered and displayed that the specific position information z and the force information Fz received at the same time correspond to each other without considering such a reception deviation by the control device 320. Therefore, in the original detection result 361, the specific position information z and the force information Fz does not correctly correspond to each other. The display control portion 340 has a function which performs a process of resolving such temporal reception deviation and accurately corresponding the inspection results to each other and displays the inspection result after the correspondence process on the display portion 330 as the first detection result 362. The temporal reception deviation amount between the specific position information z and the force information Fz can be experimentally obtained in advance. For example, by the end effector 160 being operated extremely slowly to inspect the operation component OE, and the reception time of the specific position information z and the force information Fz at that time being compared to each other, the temporal reception deviation amount therebetween can be obtained. Thus, the obtained temporal reception deviation amount of the specific position information z and the force information Fz is stored in the nonvolatile memory 342 (FIG. 1). By the display control portion 340 adding or subtracting the reception deviation amount read out from the nonvolatile memory 342 to the reception time of one of the reception logs of the specific position information z and the force information Fz, a detection result in which the specific position information z and the force information Fz accurately corresponds to each other is obtained.

The first detection result 362 is a detection result in which the specific position information z and the force information Fz accurately corresponds to each other. If such a first detection result 362 is displayed on the display portion 330, the quality of the operation component OE can be accurately determined. In particular, in the first detection result 362, since the temporal reception deviation between the specific position information z and the force information Fz is resolved and the specific position information z and the force information Fz accurately correspond to each other, the quality of the operation component OE can be accurately determined. The display of the original detection result 361 may be omitted.

The result display area RDA further includes a force value display portion (a force value display window) 363. In the example of FIG. 11, the force value display portion 363 displays numerical values of a push force F1 and a return force F2. As indicated by the first detection result 362, the push force F1 is an upper peak value in the process of pushing the end effector 160. The return force F2 is a lower peak value in the return process of the end effector 160. Such a push force F1 and a return force F2 are important inspection items in a specific type of operation component OE such as a push-button type. Therefore, if the numerical values of the push force F1 and the return force F2 is automatically detected and displayed, the quality of the inspection result can be more accurately determined. In a case where another type of operation component OE is inspected, a specific type of force value corresponding to the type of the operation component OE can be displayed on the force value display portion 363.

Generally, with respect to an inspection involving a first operation and a second operation, in which the operation directions of the end effector 160 are different from each other, as a result of the inspection, the specific value of the force in the first operation and the specific value of the force in the second operation are preferably displayed on the force value display portion 363. In the push button type operation component OEpb, the first operation is the push operation of the end effector 160a (FIG. 3), and the second operation is the return operation of the end effector 160a. In the rotary knob type operation component OErn, the first operation is an operation of rotating the end effector 160b (FIG. 4) in the +θ-direction and the second operation is an operation of rotating the end effector 160*b* in the −θ-direction. In the slide switch type operation component OEss (FIG. 6), the first operation is an operation of moving the end effector 160 that can grip the operation component OEss in one direction (for example, +x-direction) and the second operation is an operation of moving the end effector 160 in the opposite direction (for example, −x-direction). In the lever-type operation component OEve (FIG. 8), the first operation is an operation of moving the end effector 160 that can grip the operation component OEev in one direction (for example, +y-direction) and the second operation is an operation of moving the end effector 160 in the direction (for example, the −y-direction). In this way, if the numerical value of the specific force corresponding to the type in the operation component OE is automatically detected and is displayed on the force value display portion 363, the quality of the inspection result can be more accurately determined. However, the force value display portion 363 may be omitted.

In the example of FIG. 11, although only the detection result relating to the force component Fz in the z-axis direction is displayed, arbitrary a plurality of pieces of axial force component information can be displayed at the same time. For example, three force components Fx, Fy, and Fz may be simultaneously displayed as force component information in the first detection result 362. In this case, it is preferable to display the graphs of the plurality of force components Fx, Fy, and Fz in different colors. Accordingly, if a result including a plurality of correspondence relationships is displayed in which the specific position information and each of the plurality of force component information correspond to each other as the first detection result 362, since results in which the specific position information and each of the plurality of force components information accurately correspond to each other can be simultaneously observed, the quality of the operation component OE can be more accurately determined.

Figure 12:
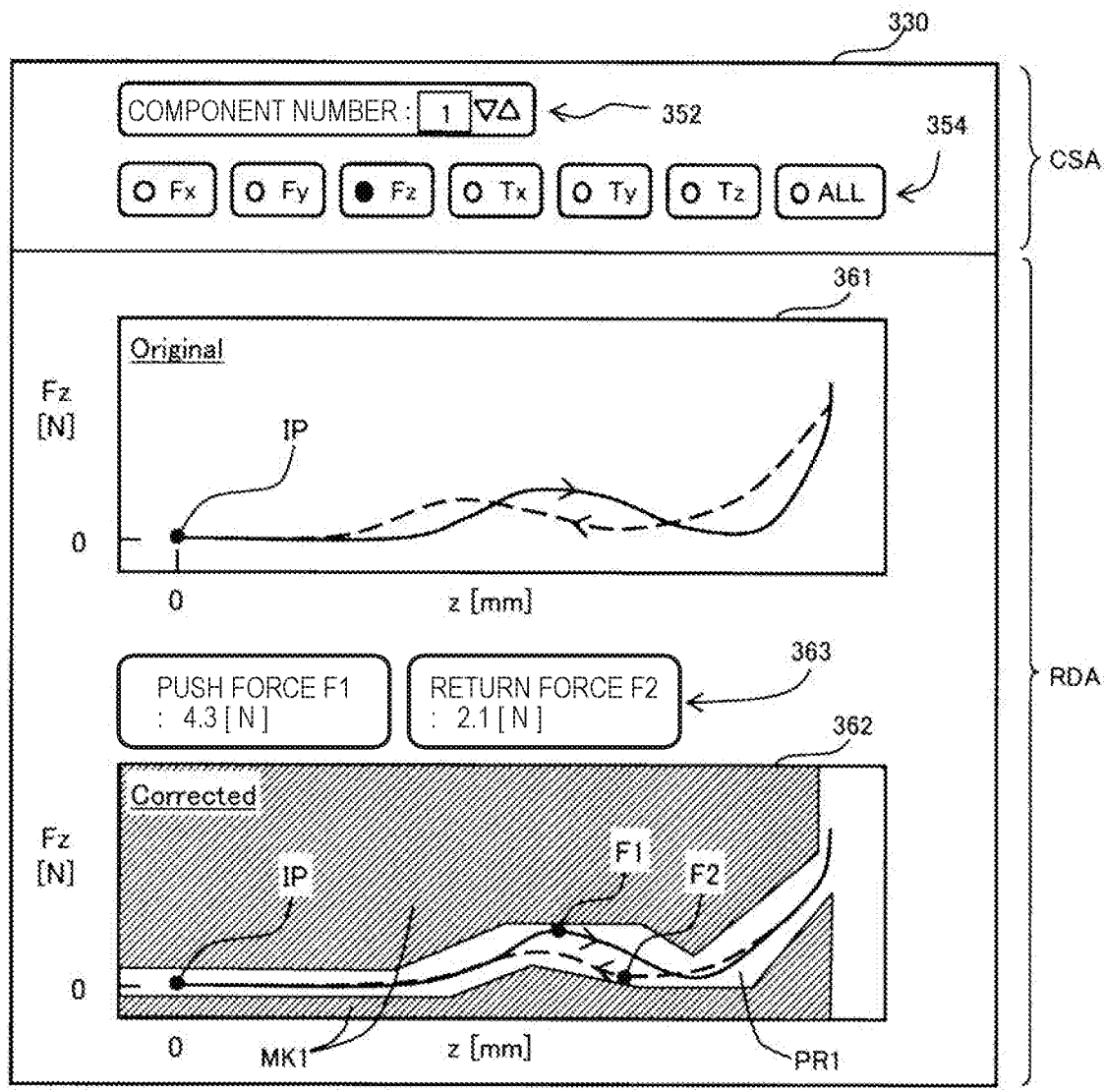
FIG. 12 is a diagram illustrating another example of an inspection result screen.

FIG. 12 illustrates another example of the inspection result screen displayed on the display portion 330. The screen is a screen that the allowable range PR1 and the mask area MK1 other than the allowable range PR1 are distinguished and displayed in a visually recognizable manner in the first detection result 362 illustrated in FIG. 11. The allowable range PR1 corresponds to the "first allowable range". If the correspondence relationship between the specific position information z and the force information Fz is within the allowable range PR1, acceptance of the inspection result of the operation component OE in the first detection result 362 can be determined. On the other hand, if the correspondence relationship between the specific position information z and the force information Fz is outside the allowable range PR1, rejection of the inspection result of the operation component OE in the first detection result 362 can be determined. If a detection result including such a display of the allowable range PR1 is used as the first detection result 362, the quality of the operation component OE can be easily determined. It is preferable that display and non-display of the allowable range PR1 are arbitrarily switchable according to the designation by the user.

Figure 13:
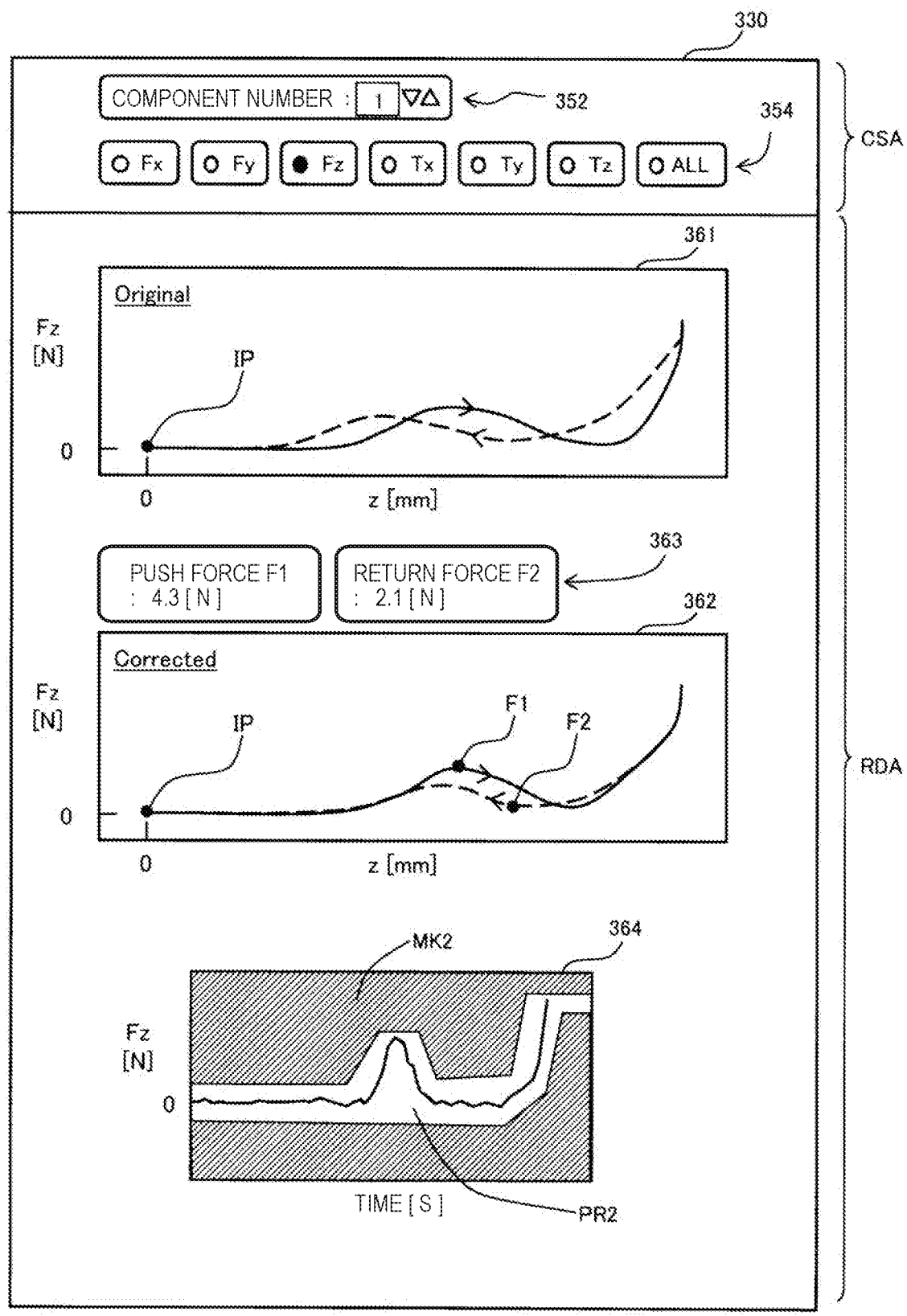
FIG. 13 is a diagram illustrating still another example of the inspection result screen.

FIG. 13 illustrates still another example of the inspection result screen displayed on the display portion 330. This screen is obtained by adding another kind of detection result 364 with allowable range to the lower side of the screen illustrated in FIG. 11. The detection result 364 indicates a state where the force information Fz changes according to the inspection time, and an allowable range PR2 and a mask area MK2 other than the allowable range PR2 are distinguishably displayed in a visually recognizable manner. In this example, if the correspondence relationship between the inspection time information and the force information is within the allowable range PR2, acceptance of the inspection result of the operation component OE in the detection result 364 can be determined. On the other hand, if the correspondence relationship between the inspection time information and the force information extends beyond the allowable range PR2, rejection of the inspection result of the operation component OE in the detection result 364 can be determined. If the detection result 364 including such a display of the allowable range PR2 is displayed, the quality of the operation component OE can be more accurately determined.

Figure 14:
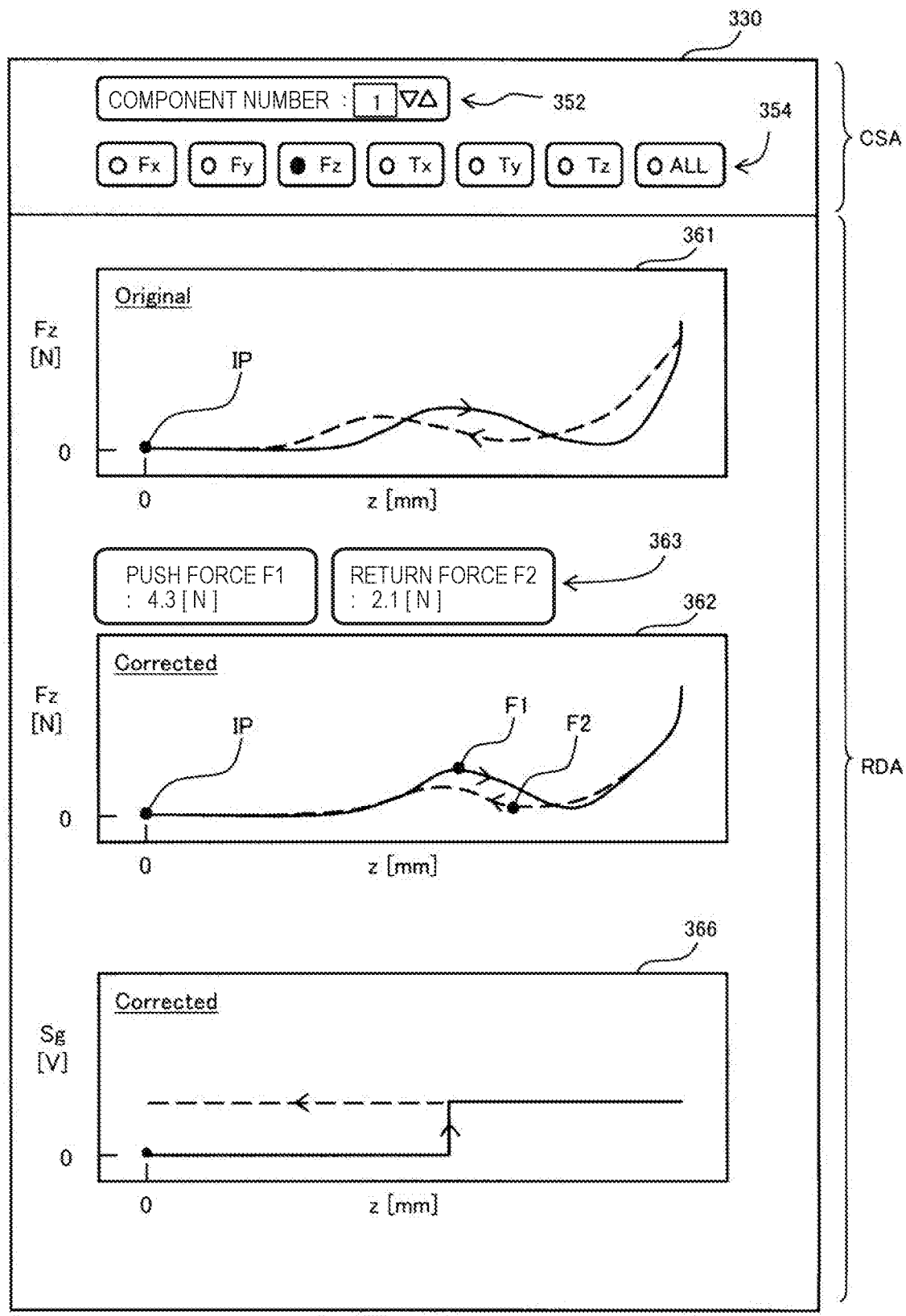
FIG. 14 is a diagram illustrating still another example of the inspection result screen.

FIG. 14 illustrates still another example of the inspection result screen displayed on the display portion 330. This screen is obtained by adding a second detection result 366 which corresponds the specific position information z and the electric signal Sg output from the operation component OE to each other at the lower side of the screen illustrated in FIG. 11. The second detection result 366 is also a detection result in which the specific position information z and the electric signal Sg of the operation component OE accurately correspond to each other, similarly to the first detection result 362 described above. The solid line indicates the inspection result in a process of pushing the operation component OEpb in the +z-direction by the end effector 160 and the broken line indicates the inspection result in a process of retracting the end effector 160 in the −z-direction. If such a second detection result 366 is displayed on the display portion 330, the quality of the operation component OE can be accurately determined. In addition, in the second detection result 366, since the temporal reception deviation between the specific position information z and the electric signal Sg of the operation component OE is resolved and accurately corresponds, the quality of the operation component OE can be accurately determined.

With regard to the second detection result 366, the detection result including the allowable range (second allowable range) as described in FIG. 12 may be displayed. In this way, the quality of the operation component OE can be more easily determined. In addition, as the second detection result 366, the result of corresponding the force information and the electric signal Sg output from the operation component OE to each other may be displayed.

Figure 15:
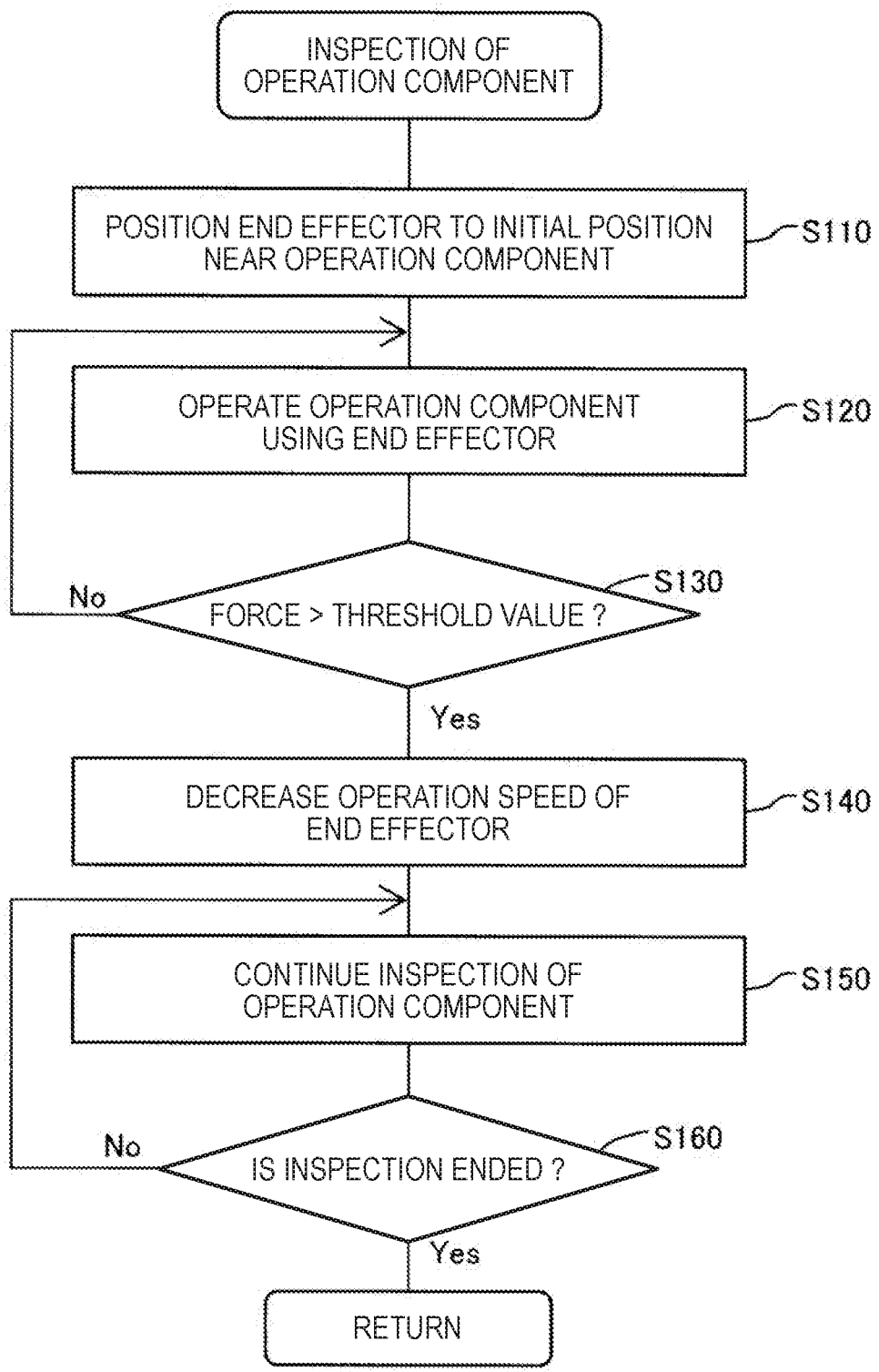
FIG. 15 is a flowchart illustrating an example of a detailed procedure of step S30 of FIG. 10.

FIG. 15 is a flowchart illustrating an example of the detailed procedure of step S30 of FIG. 10. In step S110, the end effector 160 is positioned at an initial position near the operation component OE. This initial position is a position as illustrated in FIG. 3 or FIG. 4 described above, and is specified by an operation program stored in the robot controller 180. In step S120, using the end effector 160, the operation of the operation component OE is executed. At this time, it is preferable that the end effector 160 operates at a preset fixed operation speed. The control device 320 receives the specific position information from the robot 100, the force information from the force detection portion 150, and the electric signal from the operation component OE, respectively. In step S130, the control device 320 determines whether or not the force information output from the force detection portion 150 exceeds a predetermined threshold value (first threshold value). In a case where the output from the force detection portion 150 does not exceed the threshold value, the process returns to step S120 to continue the inspection. On the other hand, in a case where the output from the force detection portion 150 exceeds the threshold value, the operation speed of the end effector 160 is lowered in step S140 and the inspection of the operation component OE is continued in step S150. In step S160, it is determined whether or not the inspection of the operation component OE is ended, and the inspection is continued until the inspection thereof is ended.

Figure 16:
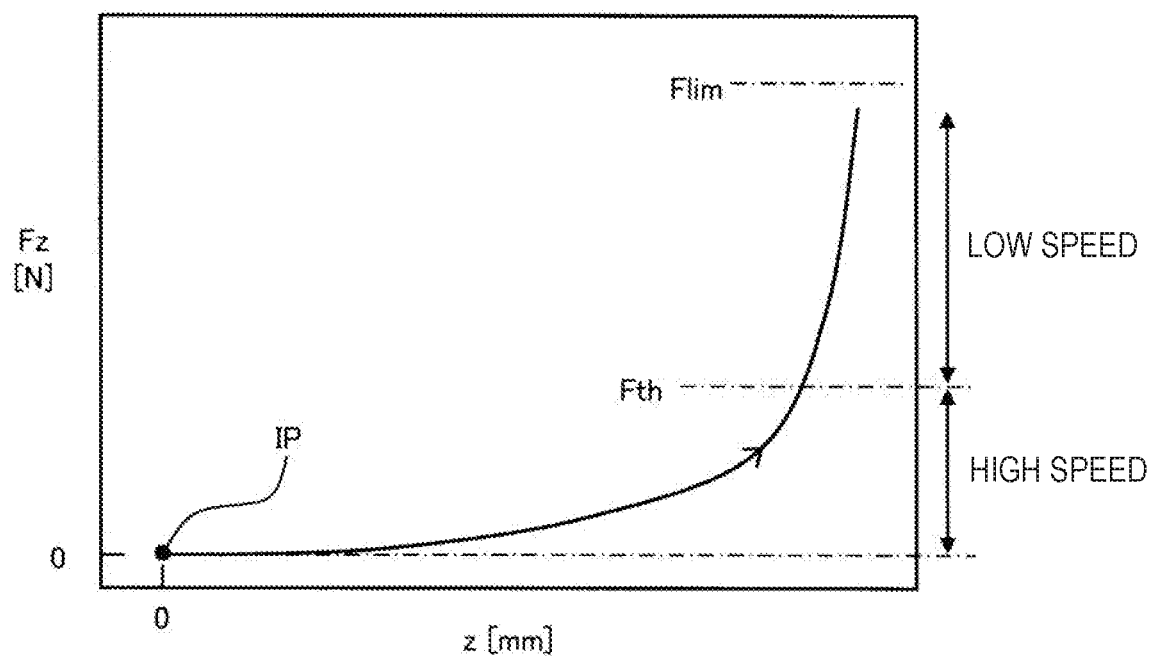
FIG. 16 is a diagram illustrating an example of an operation at the time of inspection according to the procedure of FIG. 15.

FIG. 16 illustrates an example of the operation in a case where the operation component OE is inspected according to the procedure of FIG. 15. Here, as the specific position z increases from the initial position IP, the force component Fz gradually increases. In the force component Fz, a threshold value Fth (first threshold value) is preset. In a case where the force component Fz exceeds the threshold value Fth, the operation speed of the end effector 160 is lowered and the inspection of the operation component OE is continued. In this way, after the force component Fz exceeds the threshold Fth, if the operation speed of the end effector 160 is lowered than before the force component Fz exceeds the threshold value Fth, the quality of the operation component OE can be more accurately determined. In addition, it is possible to prevent the overshoot of the operation amount with respect to the operation component OE from becoming excessively large. Further, as illustrated in FIG. 16, in a case where there is the maximum value Flim of the force component Fz allowed to be applied to the operation component OE, the problem that a force is applied to the operation component OE up to such a maximum value Flim can be suppressed. As a force component to be compared with the threshold value in step S130, one or more force components can be arbitrarily selected in advance from among one or more force components detected by the force detection portion 150.

Figure 17:
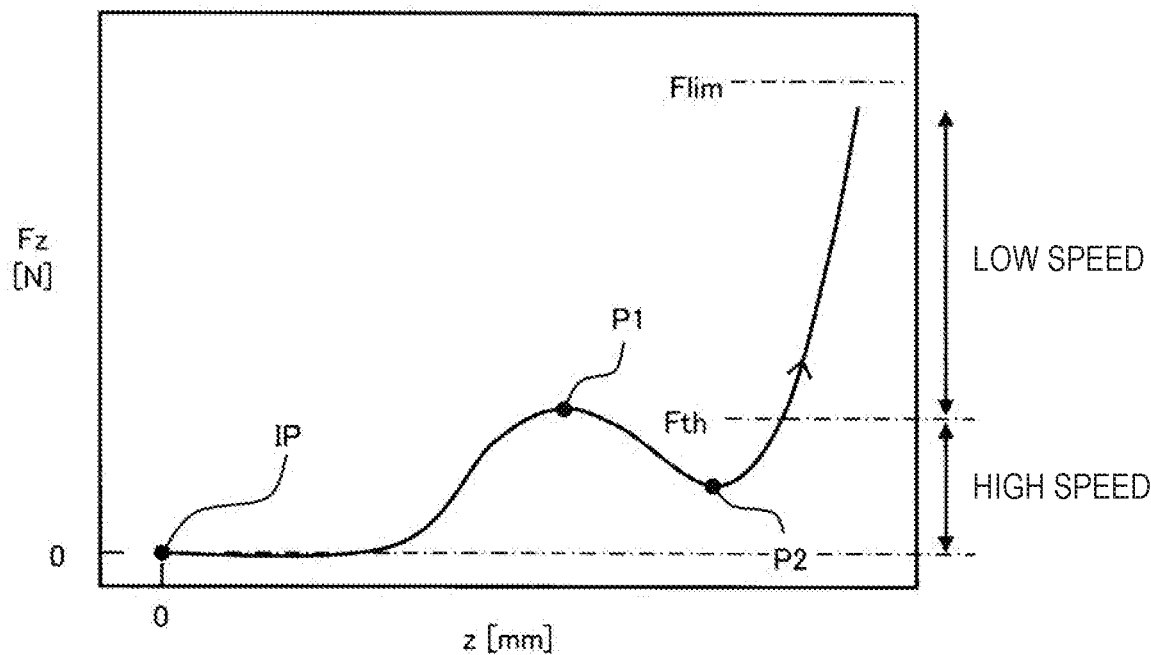
FIG. 17 is a diagram illustrating another example of an operation at the time of inspection according to the procedure of FIG. 15.

FIG. 17 illustrates another example of the operation in a case of inspecting the operation component OE according to the procedure of FIG. 15 and an example of a change in the force component Fz in the pressing process of the push-button type operation component OEpb (FIG. 3). As described in FIG. 9, the force component Fz increases as the specific position z of the robot 100 increases, in a typical push-button type operation component OEpb. In addition, the force component Fz decreases after reaching the upper peak value P1, then increases again after reaching the lower peak value P2. In this way, in a case of inspecting the operation component OE in which the upper peak value P1 and the lower peak value P2 appear in this order in the force component Fz with the progress of the specific position z of the robot 100, It is preferable that the determination of S130 in FIG. 15 is performed after the force component Fz reaches the lower peak value P2. In this way, it is possible to perform the inspection without making the operation of the end effector 160 excessively slow, and it is also possible to obtain the same effect as the case of being illustrated in FIG. 16.

Figure 18:
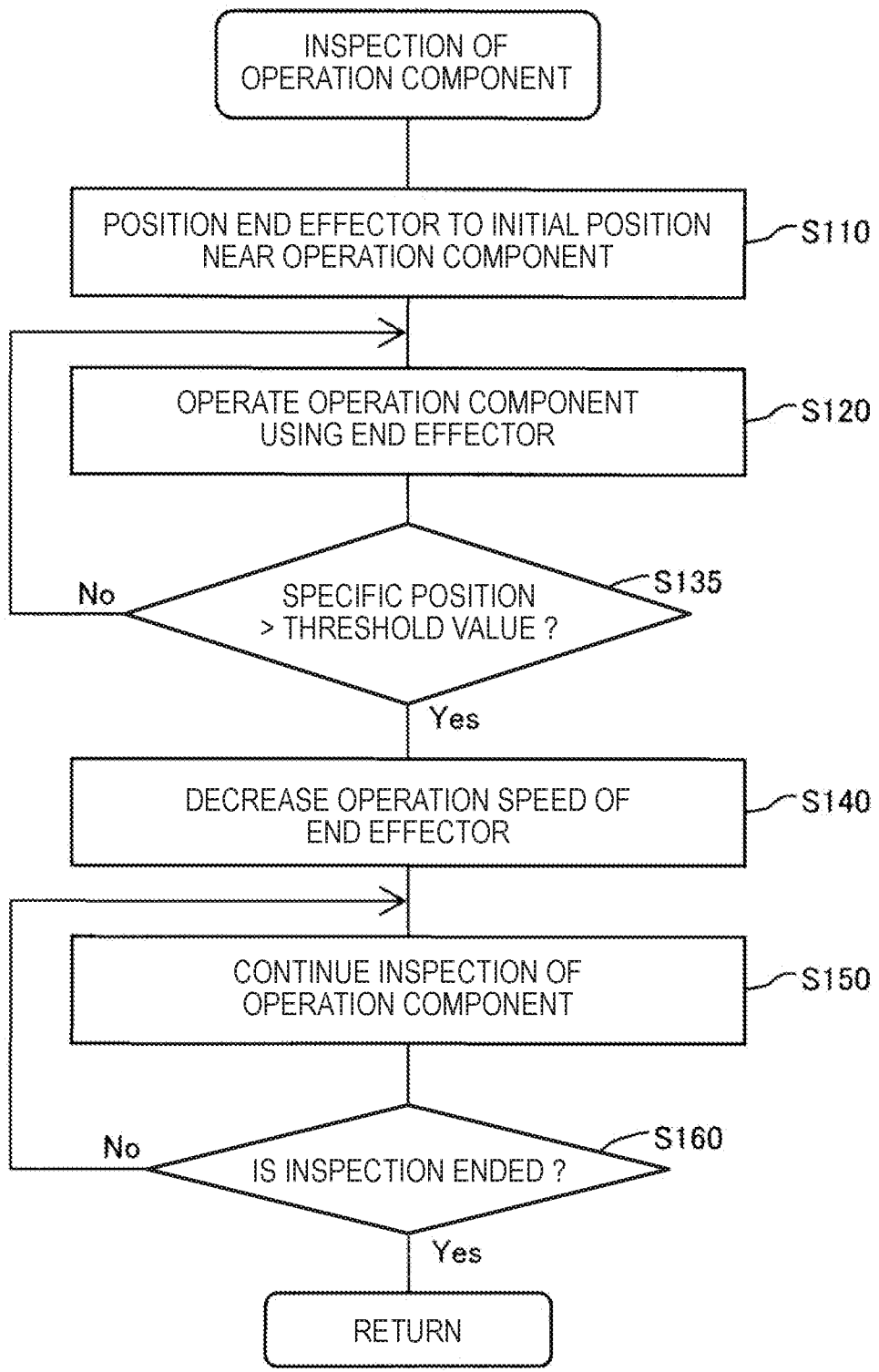
FIG. 18 is a flowchart illustrating another example of the detailed procedure of step S30 of FIG. 10.

FIG. 18 is a flowchart illustrating another example of the detailed procedure of step S30 in FIG. 10, in which step S130 in FIG. 15 is replaced with step S135. In step S135, the control device 320 determines whether or not the specific position z of the robot 100 exceeds a predetermined threshold value (second threshold value). In this way, even in a case where the operation speed of the end effector 160 is switched by using the specific position information of the robot 100 in place of the force information as described above, the same effects as those described in FIG. 15 to FIG. 17 can be also obtained.

MODIFICATION EXAMPLE

The invention is not limited to the examples and embodiments described above and can be implemented in various modes without departing from the gist thereof, for example, the following modifications are also possible.

Modification Example 1

In the embodiment, although the tool position of the robot 100 is used as the "specific position", the position of the robot 100 other than the tool position may be used as the "specific position". For example, the position of the amend 132 (more specifically, for example, intersection position between the end surface of arm end 132 and axis of joint J6) may be used as the "specific position".

Modification Example 2

In the embodiment, although the control device 320 for inspection is provided separately from the robot controller 180, the control device 320 may be realized by the robot controller 180. In addition, the control device 320 may be realized by another device (for example, teaching pendant).

Modification Example 3

In the embodiment, although the operation component unit OEU provided with one or more operation components OE is set as the inspection target. Alternatively, a single item of the operation component OE may be set as the inspection target.

Modification Example 4

In the embodiment, although the display control portion 340 creates the first detection result 362 and displays the first detection result on the display portion 330, constituent elements other than the display control portion 340 (for example, a computation portion in the control system 300, a computation portion of another device different from the control system 300, or the like) may create the first detection result 362. Also, in this case, the display control portion 340 executes a process of receiving the first detection result 362 from constituent elements thereof and displaying the first detection result on the display portion 330. In other words, the display control portion 340 may have a function of displaying the first detection result 362.

The invention is not limited to the embodiments, examples, and modifications, which are described above, and can be realized in various configurations without departing from the gist thereof. For example, in order to solve some or all of the problems described above, the technical features in the embodiments, examples, and modifications corresponding to the technical features in each aspect described in the summary of the invention or it is possible to replace or combine as necessary in order to achieve some or all of the effects described above. In addition, unless a technical feature thereof is described as essential in this specification, the technical feature can be deleted as appropriate.

The entire disclosure of Japanese Patent Application No. 2017-027886, filed Feb. 17, 2017 is expressly incorporated by reference herein.

What is claimed is:
1. A control device comprising:
   a memory configured to store computer-executable instructions and a temporal reception deviation amount; and a processor configured to execute the computer-executable instructions so as to control a robot provided with a force sensor,
wherein the processor is further configured to:
receive, at a first time, specific position information indicating a specific position of the robot, the specific position corresponding to a rotation angle of a motor provided in a joint of the robot;
receive, at a second time, force information output from the force sensor when the processor causes the robot to perform an inspection with respect to an operation component;
receive, at a third time, an electric signal from the operation component when the processor causes the robot to perform the inspection with respect to the operation component;
read out the temporal reception deviation amount from the memory, the temporal reception deviation amount corresponding to a difference between a first reference receiving time of the specific position information and a second reference receiving time of the force information output;
correlate the specific position information with the force information output by adjusting a time difference between the first time and the second time by adding or subtracting the temporal reception deviation amount to either the first time or the second time so as to provide a first detection result; and
display the first detection result on a display when the processor causes the robot to perform the inspection with respect to the operation component.

2. The control device according to claim 1,
wherein the processor is configured to display the first detection result with a first allowable range of the first detection result, and
the first allowable range relates to a correspondence relationship between the specific position information and the force information output.

3. The control device according to claim 1,
wherein the processor is configured to correlate the electric signal from the operation component with one of the specific position information or the force information output so as to provide a second detection result, and
the processor is configured to display the second detection result on the display when the processor causes the robot to perform the inspection with respect to the operation component.

4. The control device according to claim 3,
wherein the processor is configured to correlate the electric signal from the operation component with one of the specific position information or the force information output by adjusting a time difference between the third time and one of the first time or the second time so as to provide the second detection result.

5. The control device according to claim 3,
wherein the processor is configured to display the second detection result with a second allowable range of the second detection result, and
the second allowable range relates to a correspondence relationship between the electric signal from the operation component and one of the specific position information or the force information output.

6. The control device according to claim 1,
wherein the processor is configured to receive the force information outputs with respect to a plurality of axial directions from the force sensor when the processor causes the robot to perform the inspection with respect to the operation component, and
the processor is configured to correlate the specific position information with each of the force information outputs corresponding to each of the plurality of axial directions.

7. A robot system comprising:
a robot provided with a force sensor and a joint, a motor being provided in the joint;
a control device configured to control the robot, the control device including:
a memory configured to store computer-executable instructions and a temporal reception deviation amount; and
a processor configured to execute the computer-executable instructions so as to:
receive, at a first time, specific position information indicating a specific position of the robot, the specific position corresponding to a rotation angle of the motor provided in the joint of the robot;
receive, at a second time, force information output from the force sensor when the processor causes the robot to perform an inspection with respect to an operation component;
receive, at a third time, an electric signal from the operation component when the processor causes the robot to perform the inspection with respect to the operation component;
read out the temporal reception deviation amount from the memory, the temporal reception deviation amount corresponding to a difference between a first reference receiving time of the specific position information and a second reference receiving time of the force information output;
correlate the specific position information with the force information output by adjusting a time difference between the first time and the second time by adding or subtracting the temporal reception deviation amount to either the first time or the second time so as to provide a first detection result; and
display the first detection result on a display device when the processor causes the robot to perform the inspection with respect to the operation component.

8. The robot system according to claim 7,
wherein the processor is configured to display the first detection result with a first allowable range of the first detection result, and
the first allowable range relates to a correspondence relationship between the specific position information and the force information output.

9. The robot system according to claim 7,
wherein the processor is configured to correlate the electric signal from the operation component with one of the specific position information or the force information output so as to provide a second detection result, and
the processor is configured to display the second detection result on the display device when the processor causes the robot to perform the inspection with respect to the operation component.

10. The robot system according to claim 9,
wherein the processor is configured to correlate the electric signal from the operation component with one of the specific position information or the force information output by adjusting a time difference between the third time and one of the first time or the second time so as to provide the second detection result.

11. The robot system according to claim 9,
wherein the processor is configured to display the second detection result with a second allowable range of the second detection result, and
the second allowable range relates to a correspondence relationship between the electric signal from the operation component and one of the specific position information or the force information output.

12. The robot system according to claim 7,
wherein the processor is configured to receive the force information outputs with respect to a plurality of axial directions from the force sensor when the processor causes the robot to perform the inspection with respect to the operation component, and
the processor is configured to correlate the specific position information with each of the force information outputs corresponding to each of the plurality of axial directions.

13. The robot system according to claim 7,
wherein the operation component is a rotary knob.

14. The robot system according to claim 7,
wherein the operation component is a slide switch.

15. The robot system according to claim 7,
wherein the operation component is a lever.

16. The robot system according to claim 7,
wherein the processor causes the robot to perform the inspections with respect to a plurality types of the operation components, and wherein the processor is configured to cause the robot to continuously perform the inspections with respect to the plurality types of the operation components after firstly resetting the force sensor and before secondly resetting the force sensor.

17. The robot system according to claim 7,
wherein the processor is configured to operate the motor at a first operation speed before a value corresponding to the force information output from the force sensor exceeds a first threshold value,
the processor is configured to operate the motor at a second operation speed after the value corresponding to the force information output from the force sensor exceeds the first threshold value, and
the first operation speed is higher than the second operation speed.

18. The robot system according to claim 7,
wherein the processor is configured to operate the motor at a third operation speed before a value corresponding to the specific position information exceeds a second threshold value,
the processor is configured to operate the motor at a fourth operation speed after the value corresponding to the specific position information exceeds the second threshold value, and
the third operation speed is higher than the fourth operation speed.

* * * * *